(12) United States Patent
Whitworth

(10) Patent No.: US 7,008,171 B1
(45) Date of Patent: Mar. 7, 2006

(54) MODIFIED SAVONIUS ROTOR

(75) Inventor: Art Whitworth, Winterset, IA (US)

(73) Assignee: Circle Wind Corp., Truro, IA (US)

( * ) Notice: Subject to any disclaimer, the term of this patent is extended or adjusted under 35 U.S.C. 154(b) by 0 days.

(21) Appl. No.: 10/802,369

(22) Filed: Mar. 17, 2004

(51) Int. Cl.
F03D 7/06 (2006.01)

(52) U.S. Cl. .......................... 415/4.2; 415/4.4; 415/907; 416/1; 416/197 A; 416/243

(58) Field of Classification Search ............... 415/4.2, 415/4.4, 907; 416/197 A, 1, DIG. 9, 243, 416/62
See application file for complete search history.

(56) References Cited

U.S. PATENT DOCUMENTS

| 1,200,308 | A | * | 10/1916 | Bunnell ................... 415/211.1 |
| 4,005,947 | A | * | 2/1977 | Norton et al. ........... 416/197 A |
| 4,369,629 | A | * | 1/1983 | Lockwood .................... 60/698 |
| 4,830,570 | A | | 5/1989 | Benesh |
| 5,494,407 | A | * | 2/1996 | Benesh ................... 416/197 A |
| 6,015,258 | A | | 1/2000 | Taylor |
| 6,283,711 | B1 | | 9/2001 | Borg et al. |
| 6,666,650 | B1 | * | 12/2003 | Themel .................. 416/200 R |
| 2003/0209912 | A1 | | 11/2003 | Badger |

OTHER PUBLICATIONS

Website page from www.pandragon.com/windmachine, p. 1 of 1, "Modified Savonius Rotor", dated Nov. 13, 2003.

* cited by examiner

Primary Examiner—Edward K. Look
Assistant Examiner—Devin Hanan
(74) Attorney, Agent, or Firm—Sturm & Fix LLP

(57) ABSTRACT

A novel modification of a Savonius rotor used as a wind turbine provides an exhaust channel in each vane. The vane of the modified Savonius rotor is formed into an "S" shape. The air that enters a given end of the vane exits that end through the new exhaust channel into the freestream. A plurality of modified Savonius rotors are stacked one on top of the other for self-starting and greater power output. The outer surfaces of the entire assembly may be coated with photo voltaic cell material for additional energy production. In one embodiment of the invention, a cone shaped solar collector is placed on top of the entire modified Savonius rotor assembly.

20 Claims, 13 Drawing Sheets

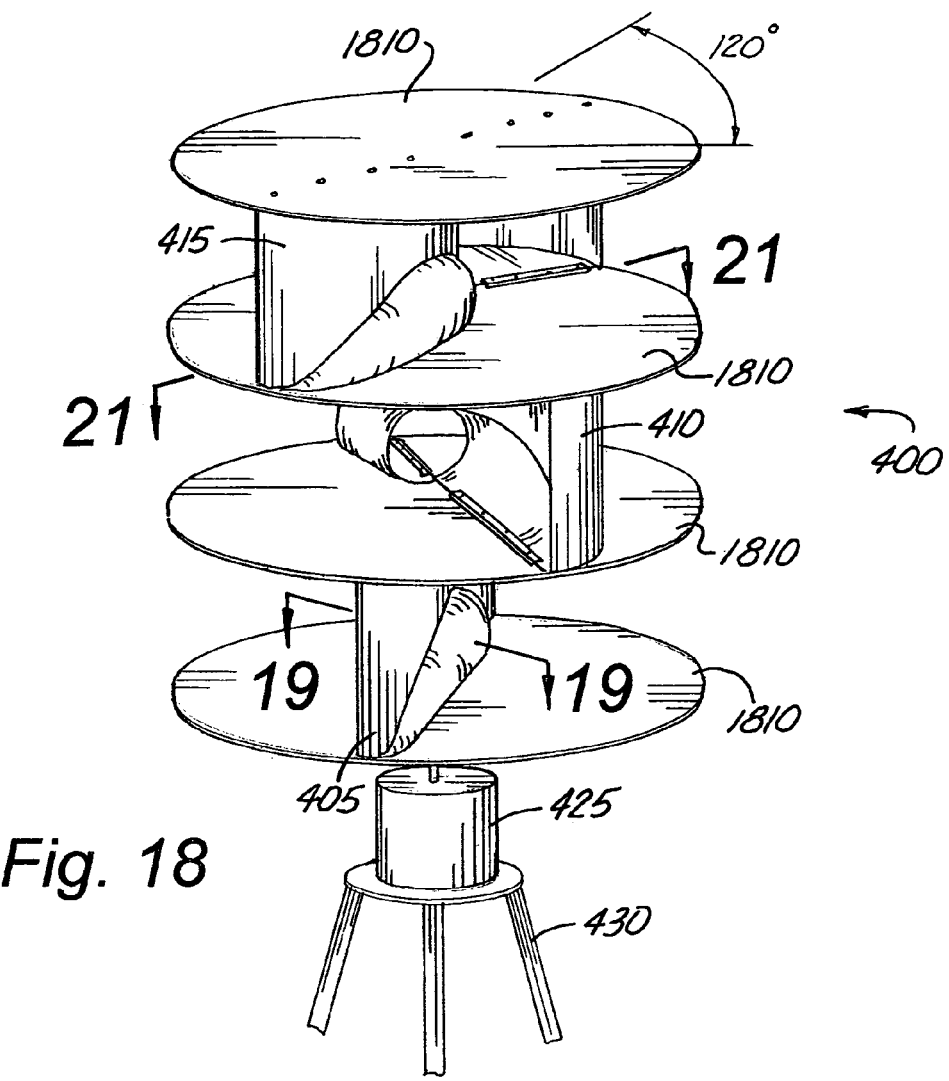
Fig. 18
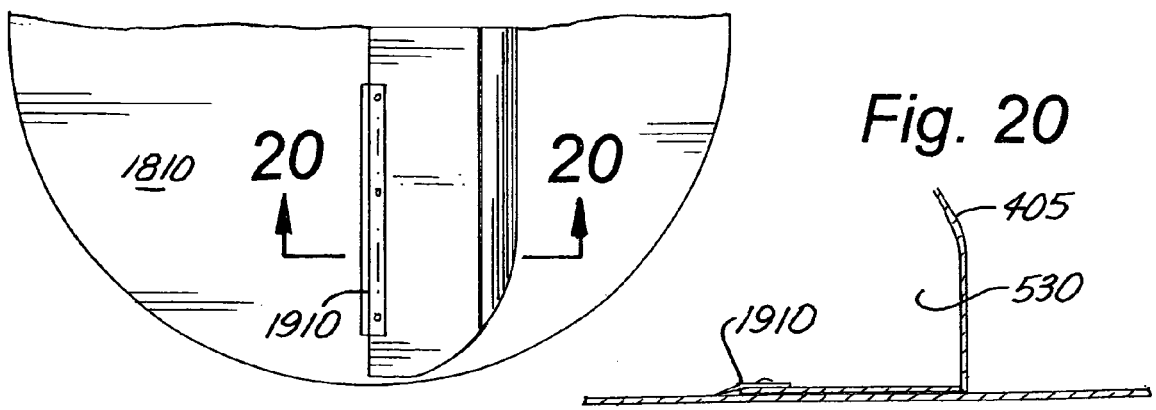
Fig. 19
Fig. 20

US 7,008,171 B1

MODIFIED SAVONIUS ROTOR

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates generally to an alternate source of energy. More particularly the present invention relates to a modification to a Savonius wind turbine rotor for converting kinetic energy in the wind to shaft power.

2. Background Art

Shaft power has been derived from the wind for centuries. Dutch windmills were first used for grist, and later converted to raising water to sea level for land reclamation. Wind power was commonly harnessed across the prairie and plains states in the U.S. for pumping water from wells. In the early part of the $20^{th}$ century, wind was utilized for converting kinetic energy to electrical energy.

The last quarter of the $20^{th}$ century saw a marked increase in interest in converting wind energy to shaft power. Many units from that era were horizontal shaft wind turbines using airfoils of various types. Drawbacks of such an arrangement are the need to have the power unit (generator, air compressor, etc.) on top of the tower with the airfoils, or the need for gearing to transfer the power toward the ground.

Efforts have been made toward improving vertical-shaft wind turbines as well. The Darius rotor utilizes airfoils in a fashion quite different than the horizontal shaft units. However, the Darius rotor is not self-starting, so a starting scheme is required.

The Savonius rotor is a self-starting, low-speed, vertical axis wind turbine (the axis need not be vertical, however, that is the usual configuration). However, in its traditional form (see FIG. 1), the Savonius rotor is known to exhibit low efficiencies. It is known as a drag-type wind turbine, as opposed to the lift-type wind turbines having horizontal axes and the Darius rotor. Rotation of the Savonius rotor is effected through momentum transfer from the air. The momentum of the air changes as its path is curved by the vanes of the Savonius rotor. Momentum exchange occurs on entrance to the vanes and on exit from the vanes. The change in momentum with time results in forces that tend to turn the Savonius rotor on its axis of rotation.

A modification to the Savonius rotor of FIG. 1 was disclosed in U.S. Pat. No. 5,494,407. The blades of this invention have been altered from half-circles in cross-section as seen in FIG. 1 to the shape shown in FIG. 2, having a linear portion nearer the axis of rotation and a curved portion, which is substantially an arc of a circle tangent to the linear portion and tangent to the circle defining the rotor diameter.

Another modification to the Savonius rotor of FIG. 1 is revealed in U.S. Pat. No. 6,283,711 wherein an additional, outer vane that is pivotally attached to the original, semi-cylindrical blade at the latter's leading edge.

A novel modification to the traditional Savonius rotor is shown in FIG. 3 wherein the vanes are reduced in size away from a vertical center such that they reach apexes at the top and bottom of the unit. Such a wind turbine can be made of light fabric material.

In all the prior art, the air flows into the cavity created by a vane, then is directed along a path that is substantially parallel to the vane until it exits the first vane and enters the second vane. The streamlines are, again, substantially parallel to this second vane. The air is finally exhausted downstream of the wind turbine to the freestream. None of the prior art discloses an exhaust port to permit air to exit the first vane without traveling through the second vane.

In addition, the known prior art does not reveal the use of Savonius rotor vanes as a surface on which to apply a solar panel.

There is, therefore, a need for an improved exit path for air to exhaust from a vane in a Savonius rotor. There is an additional need for the use of Savonius rotor vanes as a surface on which to apply solar panels.

BRIEF SUMMARY OF THE INVENTION

An object of the present invention is to provide a flow path for exiting air from a Savonius rotor without passing through a channel produced by a first and second vanes.

To effect the modification of a Savonius rotor, the two vanes are formed in a single "S" shapes vane and channels are provided, preferably along a lower edge of the vane and extending at least halfway up the vane. Through the channel is a flow path for the air to pass through the vane from the convex portion of the vane to the freestream. In shape, the exhaust channel transitions smoothly from the vane, in a shape roughly similar to a cylinder diverging from the vane.

The airflow will, in the preferred embodiment and in a coordinate system attached to the rotating modified Savonius rotor, pass along the curved vane of the Savonius rotor, thereby undergoing a change in its momentum and, therefore, imparting a force on the modified Savonius rotor causing the rotor to spin. As the air continues toward the axis of rotation of the modified Savonius rotor but before it reaches the axis of rotation, it exits through the exhaust channel which leads to the freestream.

Other objects, advantages and novel features of the present invention will become apparent from the following detailed description of the invention when considered in conjunction with the accompanying drawings.

BRIEF DESCRIPTION OF THE SEVERAL VIEWS OF THE DRAWINGS

FIG. 18 is a perspective view of a second embodiment of the modified Savonius rotor assembly of the present invention with a load and tower;

FIG. 19 is a first top plan view of the second embodiment of a modified Savonius rotor;

FIG. 20 is a detail of a lower flange of the second embodiment of the modified Savonius rotor;

DETAILED DESCRIPTION OF THE INVENTION

Figure 1:
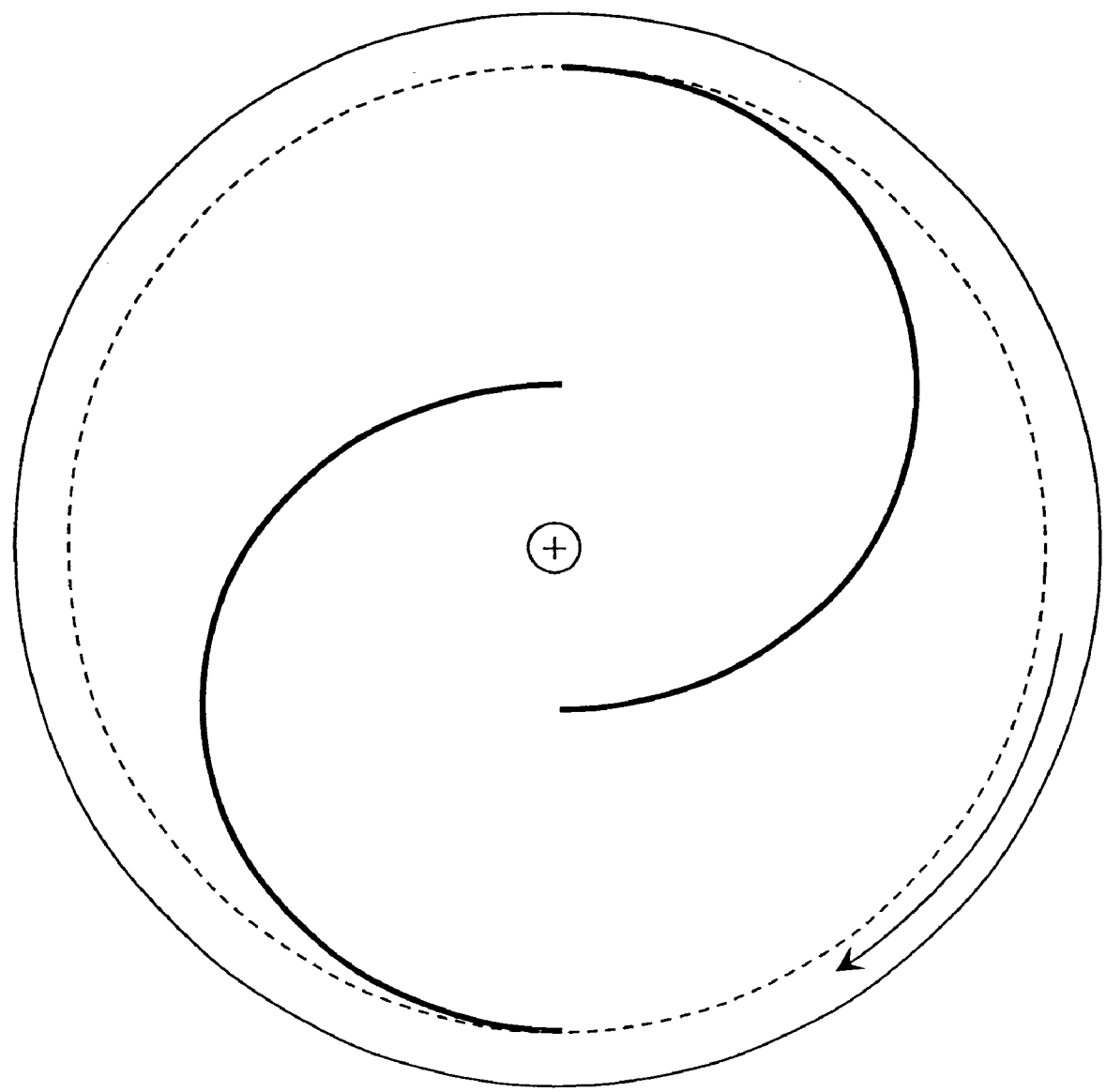
FIG. 1 is a plan view of a Savonius rotor of the prior art with semicylindrical vanes.
Figure 2:
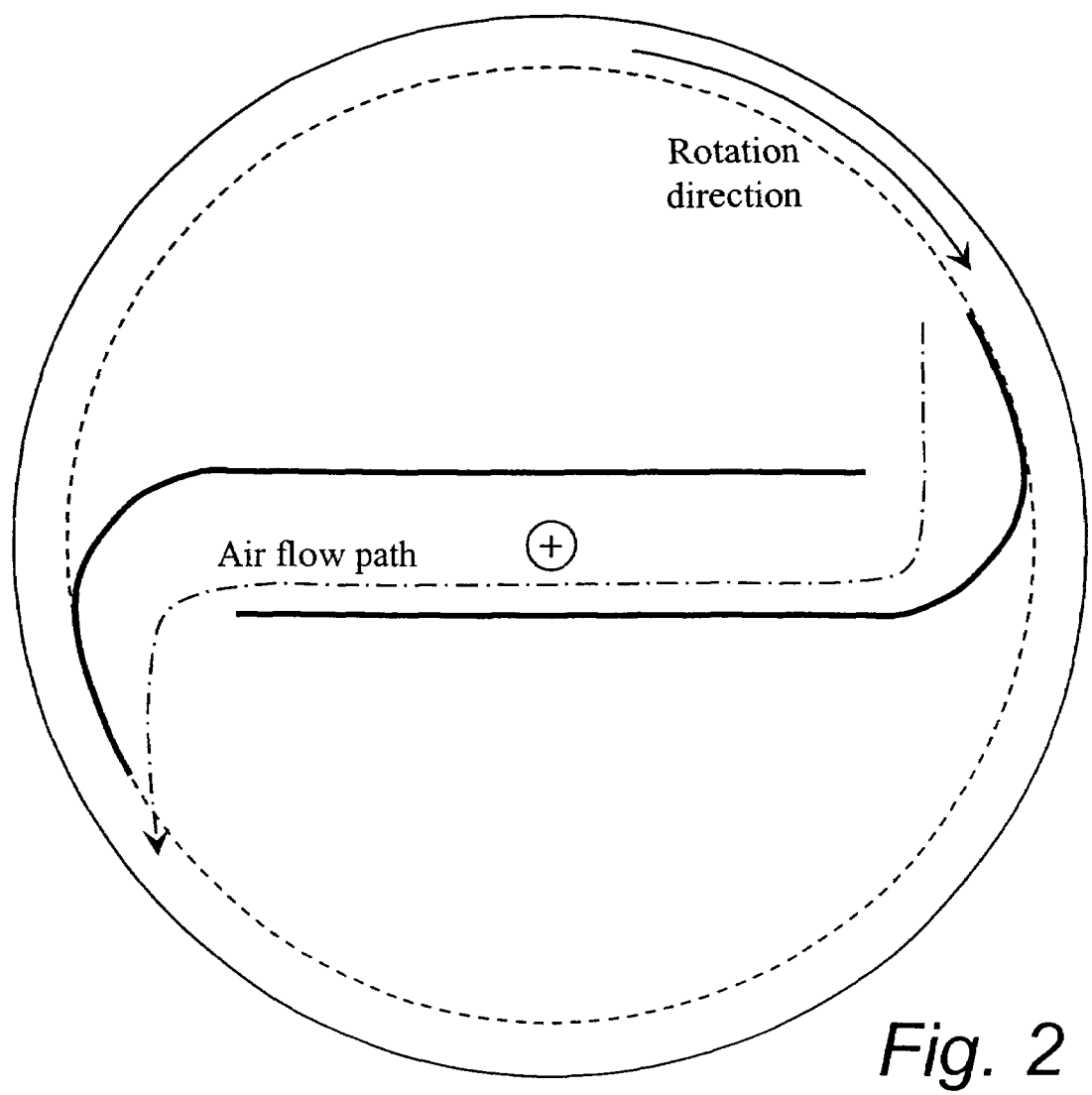
FIG. 2 is a plan view of a first modified Savonius rotor of the prior art.
Figure 3:
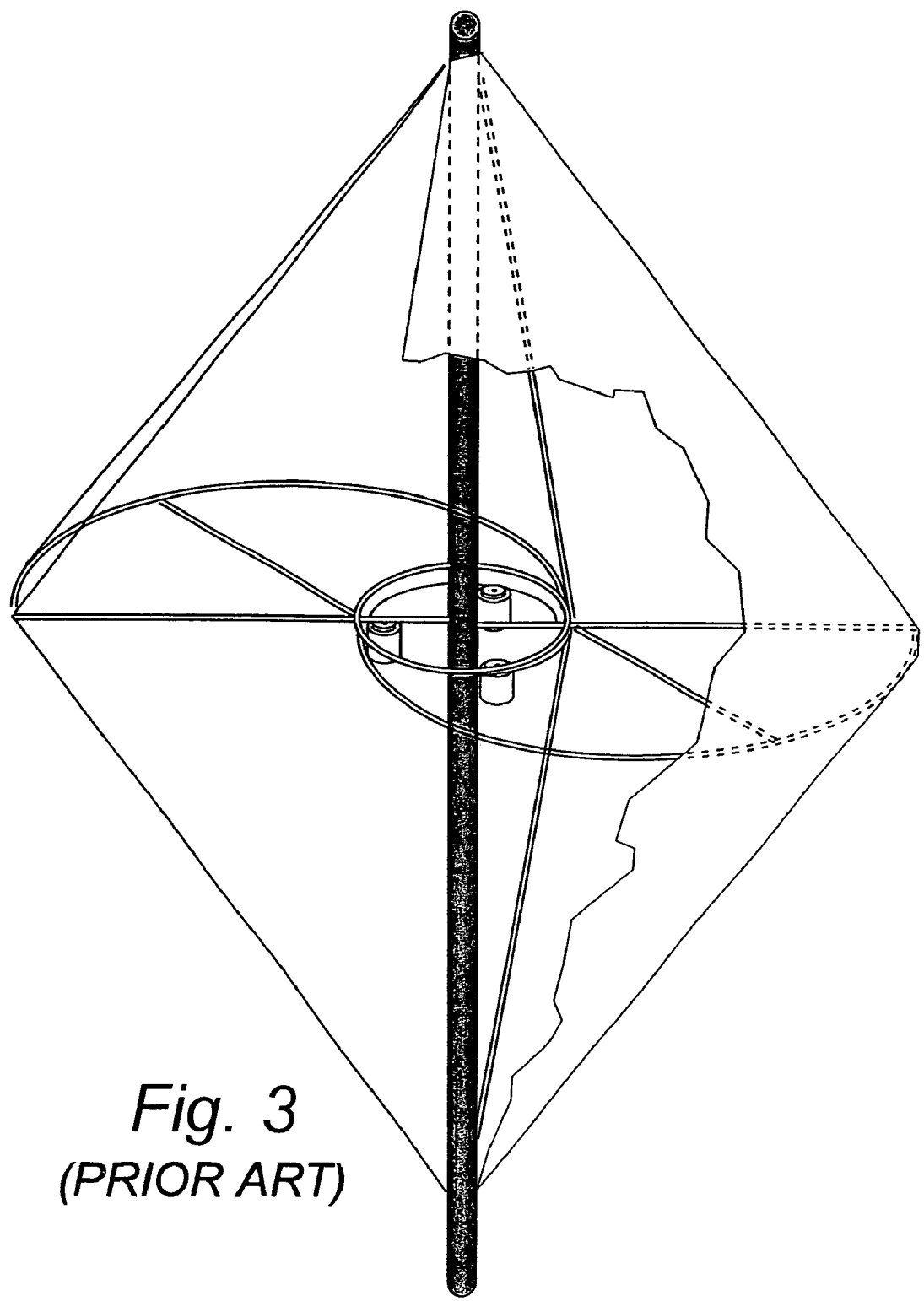
FIG. 3 is a plan view of a second modified Savonius rotor of the prior art.
Figure 4:
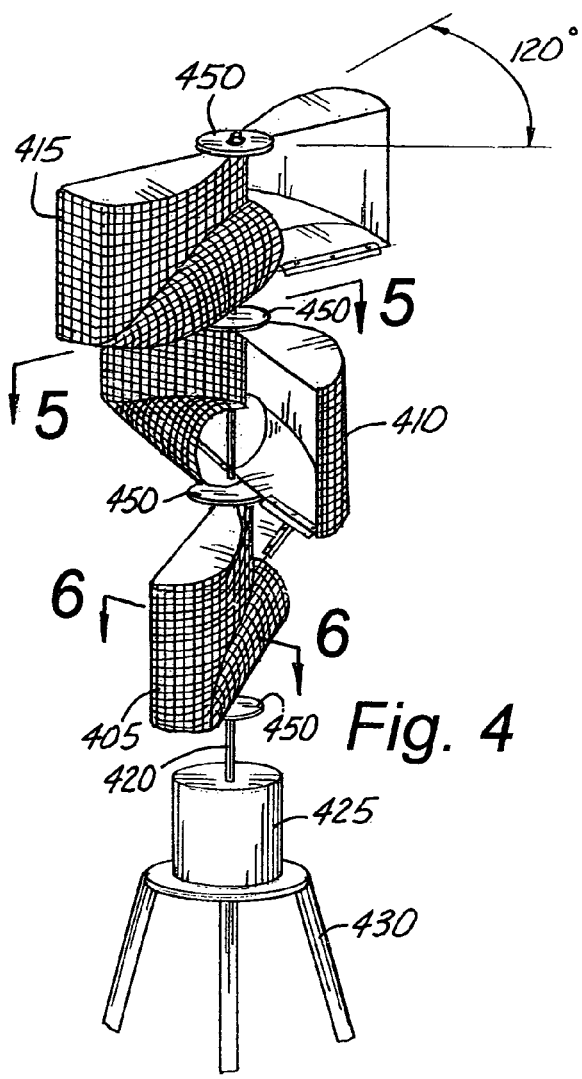
FIG. 4 is a perspective view of a modified Savonius rotor assembly of the present invention with a load and tower.

A set of three (3) modified Savonius rotors 405, 410, 415 are shown stacked vertically in FIG. 4 in a rotor assembly 400 in a first embodiment of the invention. By angling the "S" shaped vanes differently for each set (in this case 120° apart), automatic startup is assured because at least one rotor will be turned such that the change in momentum of the wind will cause the assembly to turn. The set of modified Savonius rotors 405, 410, 415 in the assembly 400 are rigidly affixed to a shaft 420 which rotates as the modified Savonius rotors 405, 410, 415 rotate. A bearing (not shown) at a lower end of the shaft 420 provides reduced friction rotation. Via the shaft 420, power is transmitted to a power converting device 425 such as an electrical generator, an air compressor, pump, etc. An advantage of the Savonius rotor over horizontal-shaft wind turbines is the ability to locate the power converting device 425 at or near ground level where it is accessible for installation, maintenance, repair, and inspection.

Usually, a tower 430 is used to elevate the modified Savonius rotor assembly 400 into higher wind speeds to increase the power output of the power converting device 425.

A support plate 450 is installed at the top of each of the modified Savonius rotors 405, 410, 415 and the bottom of the lowest modified Savonius rotor 405 to provide rigidity.

In this first embodiment of the invention, outer surfaces of the modified Savonius rotor assembly 400 are coated with photovoltaic cells as indicated by the crosshatching in FIGS. 1–17.

Figure 5:
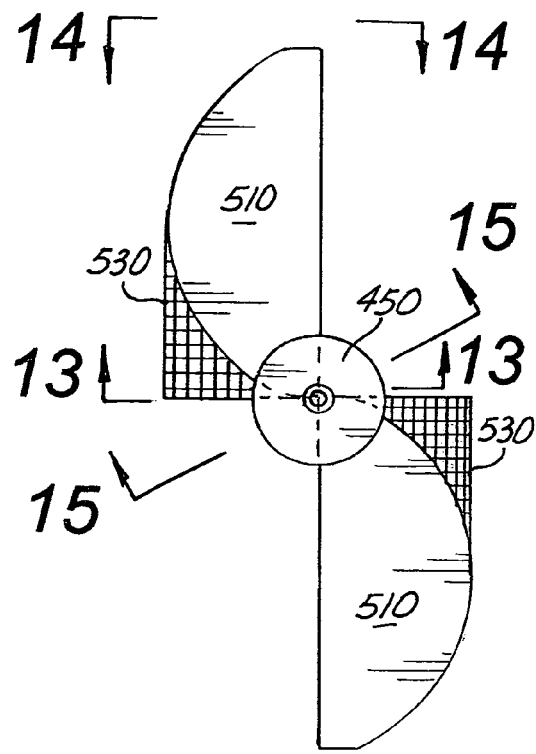
FIG. 5 is a first top plan view of a modified Savonius rotor.

In FIG. 5 a top plan view of a single modified Savonius rotor is depicted. Top flanges 510 and bottom flanges 610 (see FIG. 6) provide stability for each end of the "S" shaped vane 710 (see FIG. 7) and channeling of the air along the vane's surface. The outsides of the exhaust channels 530 are clearly seen in FIG. 5, the exhaust channel being extending out from the convex faces of the vane 710.

Figure 6:
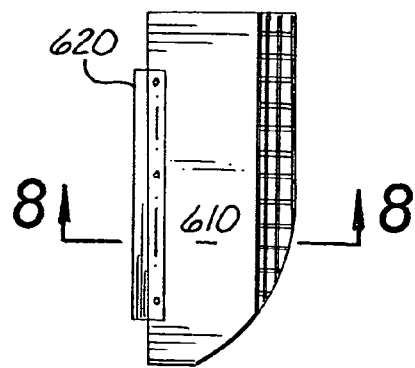
FIG. 6 is a detail of a lower flange of the modified Savonius rotor.

A plan view of an end of an "S" shaped vane from a horizontal midsection is seen in FIG. 6. A lower flange 610 is clearly seen, as well as a portion of the exhaust channel 530. A metallic edge 620 is applied to the lower flange 610 to enhance rigidity and provide some protection from abrasion.

Figure 7:
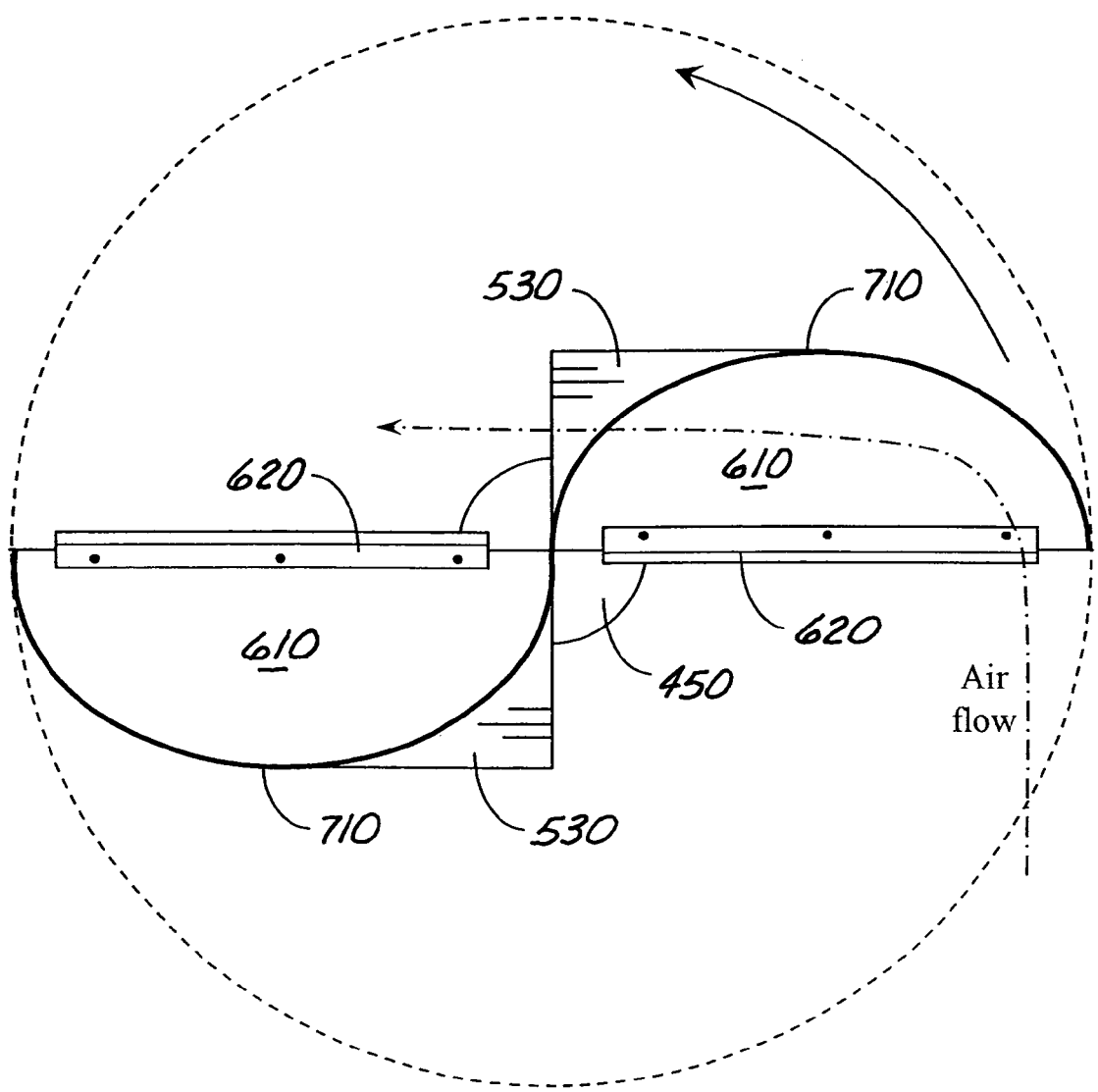
FIG. 7 is a first top plan view of the modified Savonius rotor.

The top flanges 510 and upper support plate 450 have been removed in FIG. 7 to more clearly see the "S" shaped vane 710 of the modified Savonius rotor. The exhaust channels 530 are seen from above. The air flow across one end of the vane 710 for a given position of the vane 710 is indicated.

Figure 8:
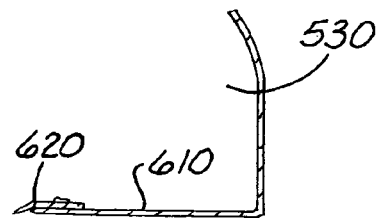
FIG. 8 is a first detail of an exhaust channel of the modified Savonius rotor.

FIG. 8 is a cross section of a lower portion of a modified Savonius rotor vane. The wall of the exhaust channel 530 and the lower flange 610 are clearly seen. The metallic edge 620 is affixed to the leading edge of the lower flange 610.

Figure 9:
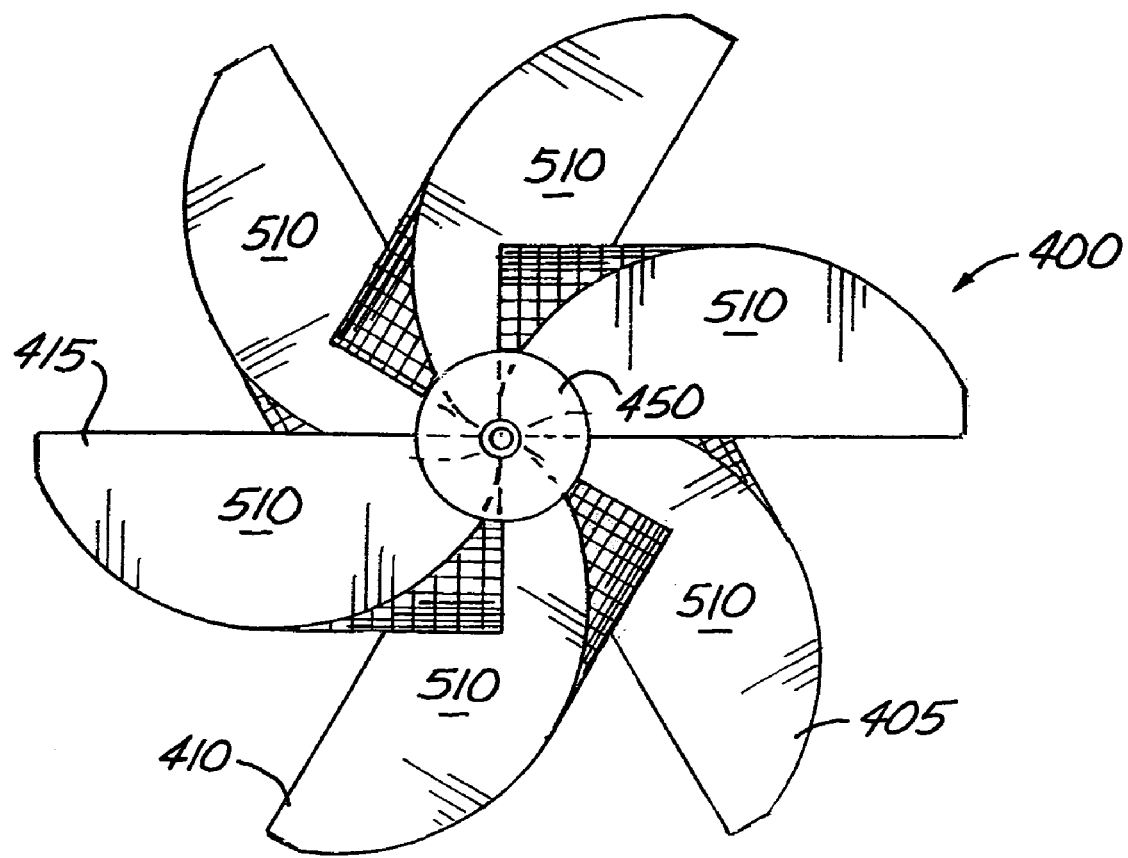
FIG. 9 is a first plan view of the modified Savonius rotor assembly.

A top view of the modified Savonius rotor assembly 400 is shown in FIG. 9. From this angle, the 120° shifts in angle are evident between each of the modified Savonius rotors 405, 410, 415.

Figure 10:
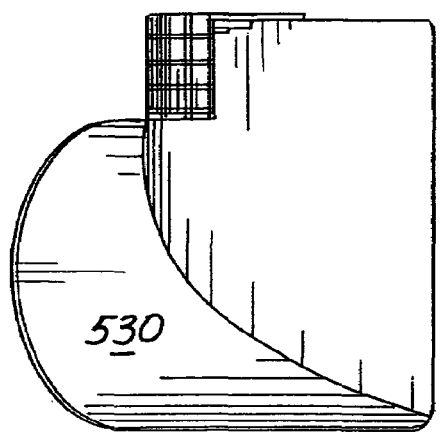
FIG. 10 is a second detail of an exhaust channel of the modified Savonius rotor.

FIG. 10 is a view from the concave side of one end of a vane 710 of the modified Savonius rotor 405 in the neighborhood of the axis of rotation. From the angle of FIG. 10, the interior of the exhaust channel 530 is clearly seen.

Figure 11:
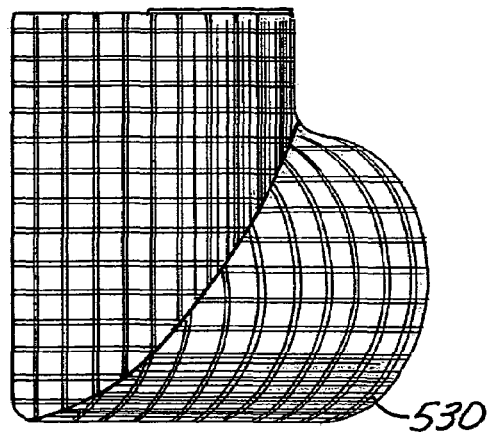
FIG. 11 is a third detail of an exhaust channel of the modified Savonius rotor.

In FIG. 11, the direction of view is opposite that of FIG. 10. From the angle of FIG. 11, the convex side of one end of the vane 710 and the outer wall of the exhaust channel 530 are seen.

Figure 12:
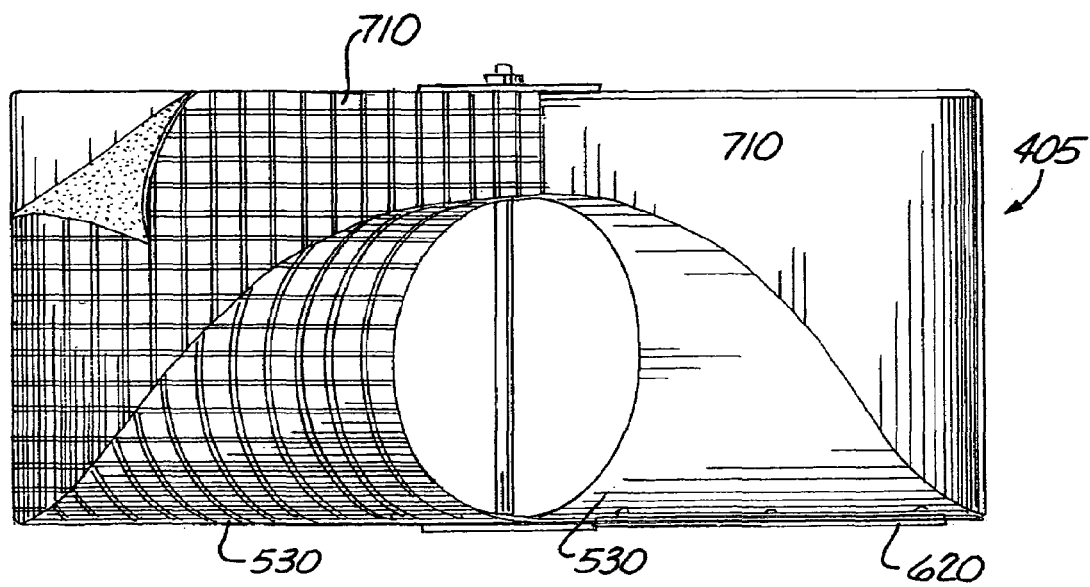
FIG. 12 is a side elevation view of the modified Savonius rotor.

A side view of the modified Savonius rotor 405 is shown in FIG. 12. On the left, the vane 710 is viewed from its convex side, and the exhaust channel 530 is seen from its outside. On the right, the vane 710 is viewed from its concave side, and the inner surface of the exhaust channel 530 is seen.

Figure 13:
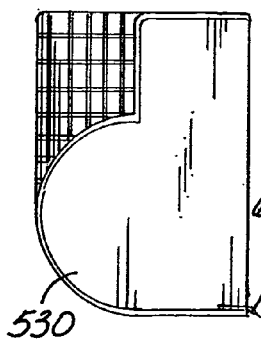
FIG. 13 is a fourth detail of an exhaust channel of the modified Savonius rotor.
Figure 14:
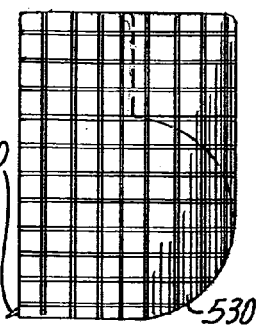
FIG. 14 is a fifth detail of an exhaust channel of the modified Savonius rotor.
Figure 16:
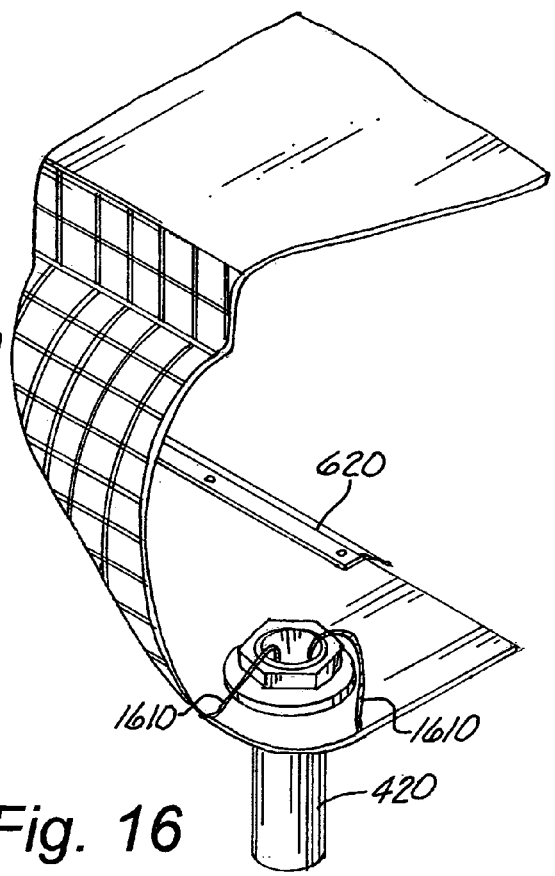
FIG. 16 is a perspective view of a slip ring assembly.

FIGS. 13 and 14 further detail the exhaust channel 530. In FIG. 13, the view is toward the inside of the exhaust channel 530 whereas FIG. 14 is a view of the outside of the exhaust channel 530.

Figure 15:
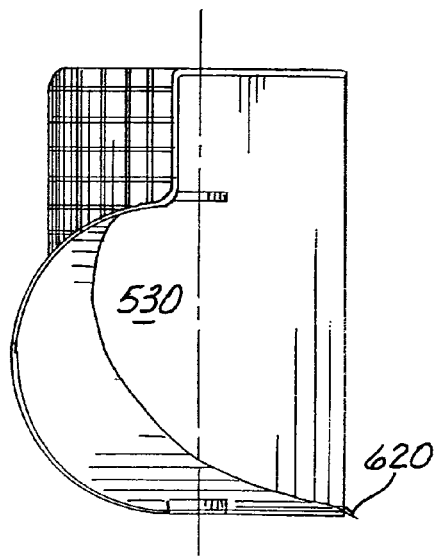
FIG. 15 is a sixth detail of an exhaust channel of the modified Savonius rotor.

Another view from the open end of the exhaust channel 530 is shown in FIG. 15.

Figure 17:
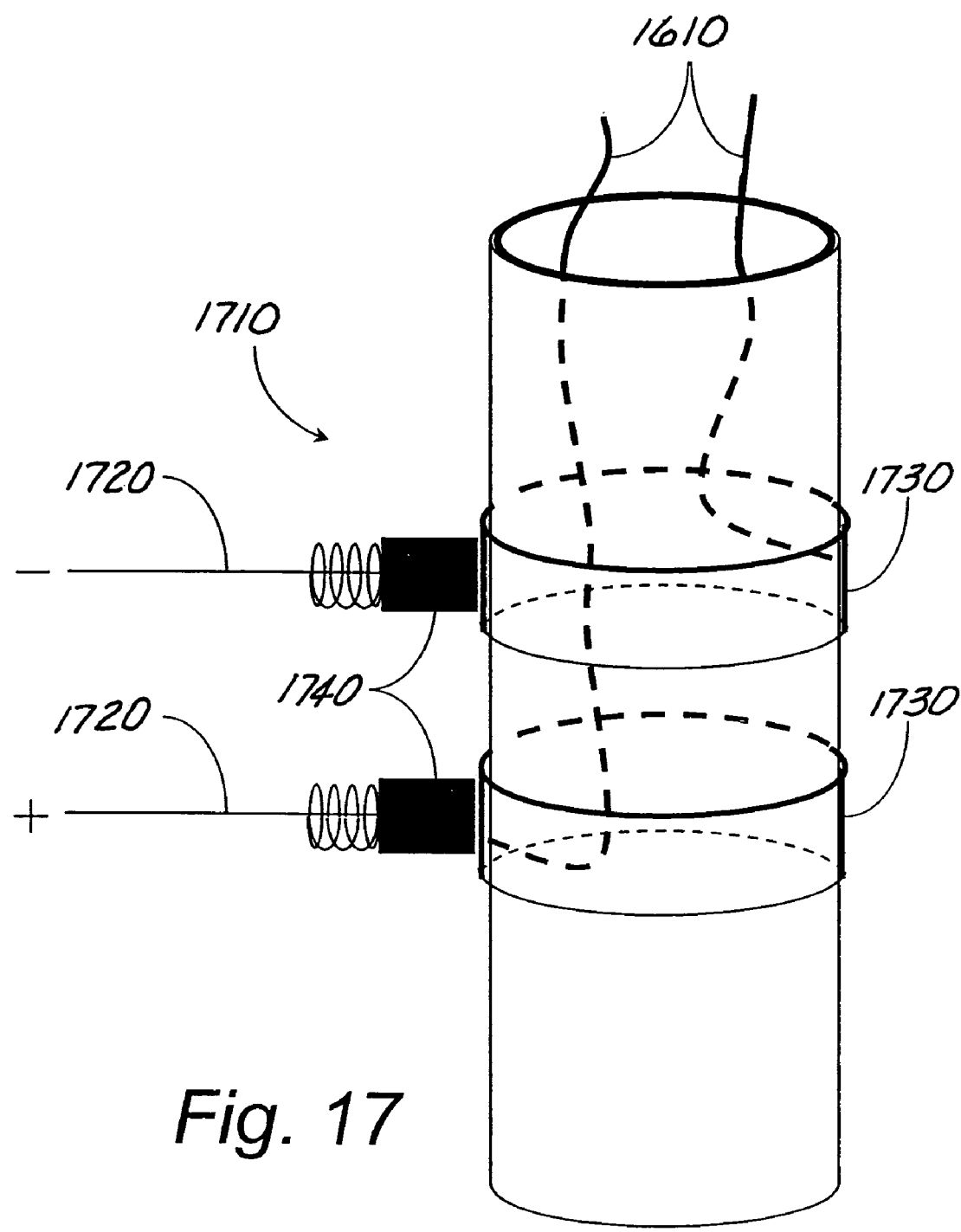
FIG. 17 is a detail of the slip ring assembly.

Because solar panels are affixed to the outer surfaces of the modified Savonius rotor assembly 400, the energy produced by the photovoltaic cells must be transferred to the ground for use or storage. Wires 1610 lead from the photovoltaic cells through the hollow shaft 420 towards the ground. Near the power converting device, a slip ring assembly 1710, shown in FIG. 17, is used to transfer the electrical power from the wires 1610 rotating with the shaft 420 to stationary wiring 1720. The wires 1610 from the photovoltaic cells lead through the hollow shaft 420 to slip rings 1730 that are electrically insulated from each other. Stationary brushes 1740 are forced against the slip rings 1730 and are connected to the wiring 1720 provide the conductive path for the electrical power to take from the rotating slip rings 1730 to the stationary components 1720, 1740. The stationary wiring 1720 conduct the current to storage, an inverter, or end use.

A second embodiment of the present invention is shown in FIG. 18 wherein larger support plates 1810 are used in place of the smaller support plates 450 shown in FIGS. 4 and 5 and no photovoltaic cells are utilized. In this preferred embodiment, each support plate 1810 is attached to the top flange 510 and bottom flange 610 by bolts or rivets as shown. Other possibilities for adjoining a support plate 1810 and a vane 710 are by adhesive or combining the top and bottom flanges 510, 610 into one support plate 1810.

The view shown in FIG. 19 is similar to that of FIG. 6 with the addition of the larger support plate 1810 and the absence of solar collecting material. Again, a metallic edge 1910 is provided on the leading edge of the bottom flange 610. A detail of a cross section of the vane 710 and metallic edge 1910 is shown in FIG. 20. The metallic edge 1910 has a sharpened leading edge to reduce the disturbance to the boundary layer of the flow over the support plate 1910 and bottom flange 610.

Figure 21:
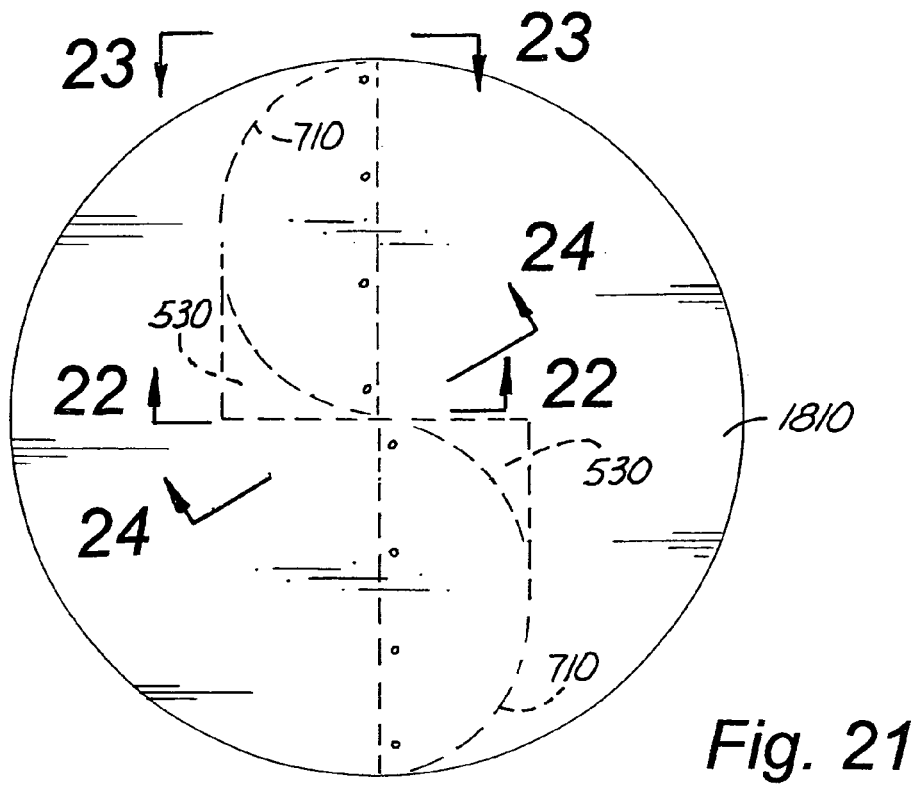
FIG. 21 is a first top plan view of the second embodiment of the modified Savonius rotor.

Looking through the top flanges 510 and upper support plate 1810 in FIG. 21, the "S" shaped vane 710 of the modified Savonius rotor can be discerned. The exhaust channels 530 are also seen.

Figure 22:
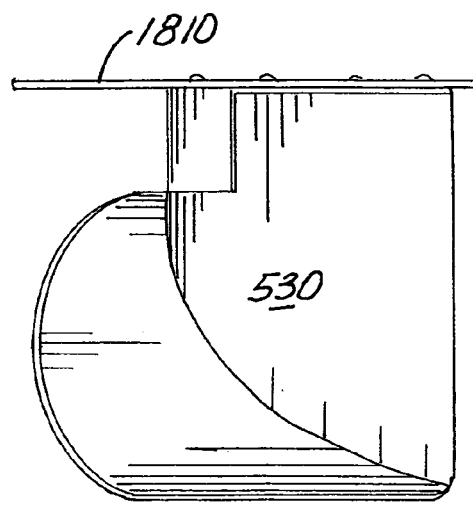
FIG. 22 is a first detail of an exhaust channel of the second embodiment of the modified Savonius rotor.
Figure 23:
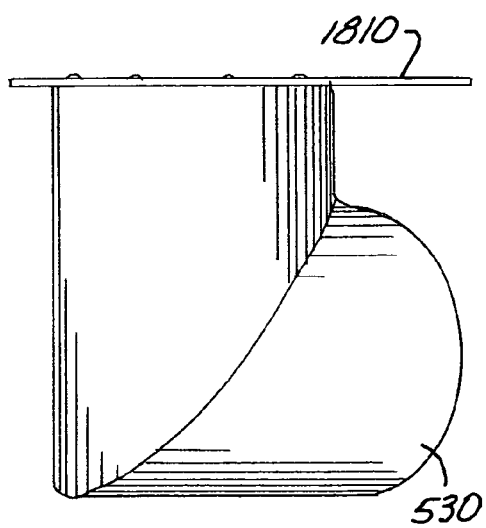
FIG. 23 is a second detail of an exhaust channel of the second embodiment of the modified Savonius rotor.

FIGS. 22 and 23 further detail the exhaust channel 530. In FIG. 21, the view is toward the inside of the exhaust channel 530 whereas FIG. 22 is a view of the outside of the exhaust channel 530. The larger support plates 1810 are seen in these views.

Figure 24:
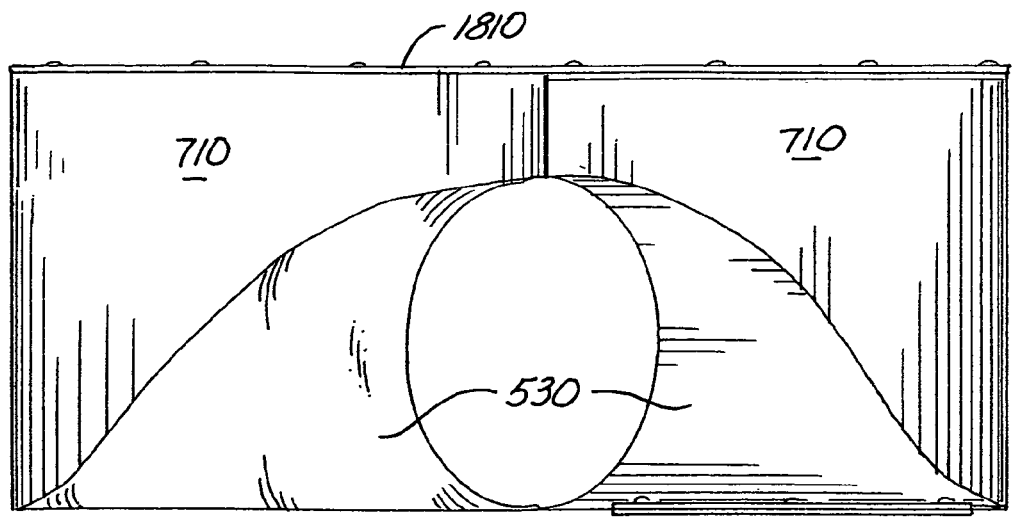
FIG. 24 is a side elevation view of the second embodiment of the modified Savonius rotor.

A side view of the modified Savonius rotor 405 is shown in FIG. 24. On the left, the vane 710 is viewed from its convex side, and the exhaust channel 530 is seen from its outside. On the right, the vane 710 is viewed from its concave side, and the inner surface of the exhaust channel 530 is seen.

Figure 25:
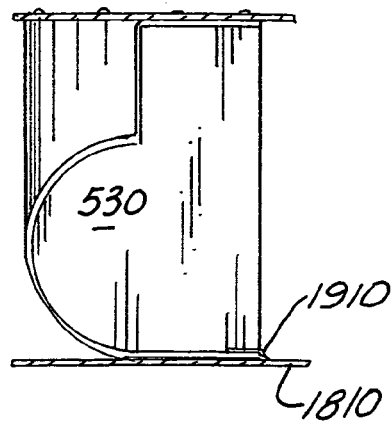
FIG. 25 is a third detail of an exhaust channel of the second embodiment of the modified Savonius rotor.
Figure 26:
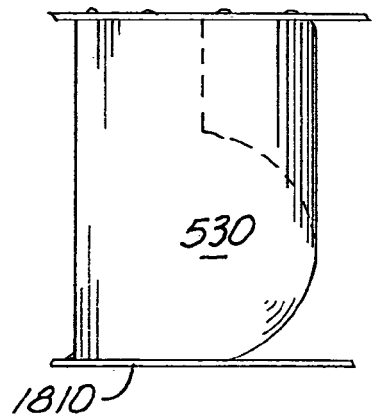
FIG. 26 is a fourth detail of an exhaust channel of the second embodiment of the modified Savonius rotor.
Figure 27:
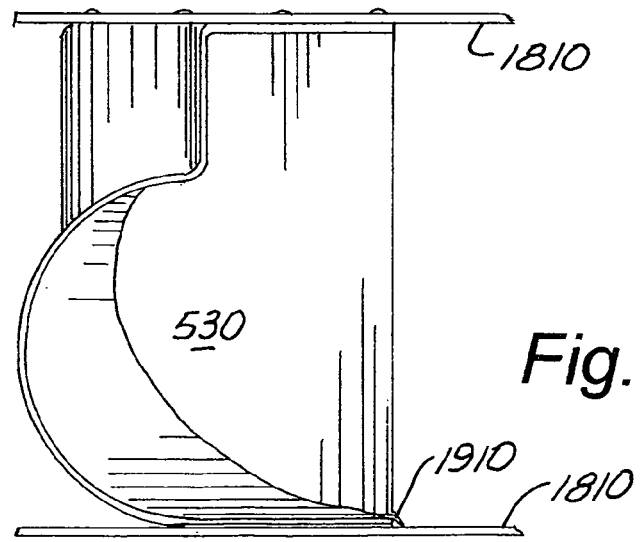
FIG. 27 is a fifth detail of an exhaust channel of the second embodiment of the modified Savonius rotor.

Two other views of the exhaust channel 530 for the second embodiment of the invention are shown in FIGS. 25 and 26. The inside of the exhaust channel 530 is shown in FIG. 25 whereas the outside of the exhaust channel 530 is shown in FIG. 26.

Another view from the open end of the exhaust channel 530 is shown in FIG. 23.

Figure 28:
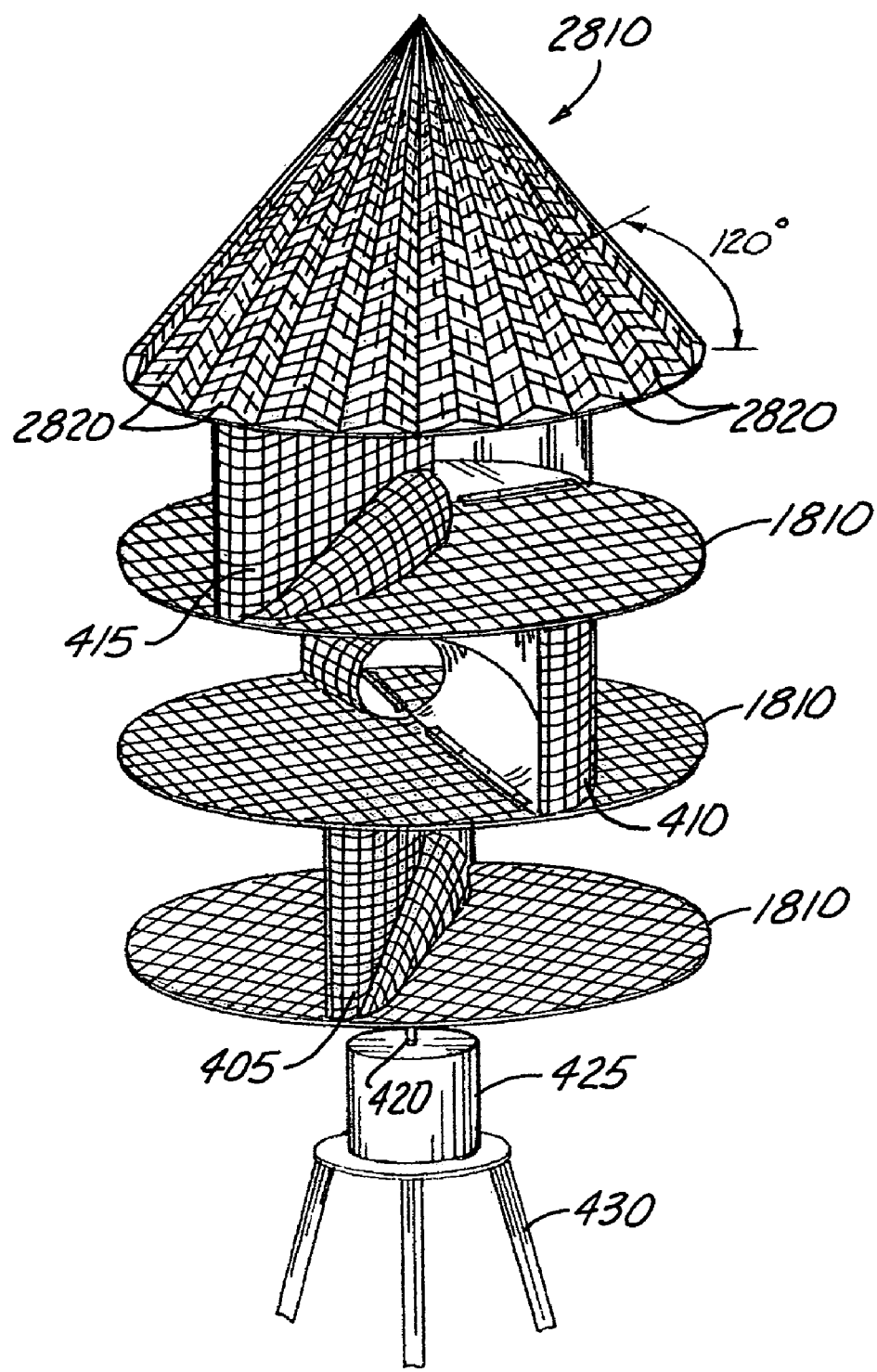
FIG. 28 is a perspective view of an assembly of a third embodiment of the modified Savonius rotor.

A third embodiment of the modified Savonius rotor assembly 400 is shown in FIG. 28 wherein the assembly shown in FIG. 18 is outfitted with the addition of a cone-shaped solar collector 2810 at its top. Separate isosceles triangular sections 2820 of photovoltaic solar cells are creased so as to have a ridge running from the top apex to the base. These individual triangular sections 2820 are adjoined to produce the cone shape. As shown, the cone has an included angle of 120°.

The above embodiment is the preferred embodiment, but this invention is not limited thereto. It is, therefore, apparent that many modifications and variations of the present invention are possible in light of the above teachings. It is, therefore, to be understood that within the scope of the appended claims, the invention may be practiced otherwise than as specifically described.

I claim:

1. A Savonius rotor wind turbine comprising:
    (a) a rotational axis upon which a Savonius rotor is rotatably disposed;
    (b) a least one vane having at least one concave and at least one convex side, said concave side, in cross-section along a plane perpendicular to said rotational axis, consisting of a line which is continuously curved; and
    (c) at least one exhaust channel through each at least one vane, each of said at least one exhaust channel providing a flow path permitting air to pass through the Savonius rotor vane from the concave side to the convex side of each at least one vane of the Savonius rotor.

2. The Savonius rotor wind turbine of claim 1 wherein the at least one vane comprises an "S" shaped vane when viewed from and axis of rotation.

3. The Savonius rotor wind turbine of claim 1 wherein the exhaust channel is constructed so that air passing through the exhaust channel enters a freestream.

4. The Savonius rotor wind turbine of claim 1 additionally comprising circular support plates operably affixed to a top and a bottom of the Savonius rotor, wherein said circular support plates are symmetric about an axis of rotation.

5. The Savonius rotor wind turbine of claim 1 wherein the circular support plates have a diameter substantially equal to an overall length of the Savonius rotor vane.

6. The Savonius rotor wind turbine of claim 1 additionally comprising a plurality of Savonius rotors vertically disposed and operatively fastened one to another.

7. The Savonius rotor wind turbine of claim 6 wherein the plurality of Savonius rotors are oriented at fixed, rotated angular positions with respect to one another.

8. The Savonius rotor wind turbine of claim 1 additionally comprising photovoltaic cells affixed to outside surfaced of the Savonius rotor.

9. The Savonius rotor wind turbine of claim 8 additionally comprising a conical solar collector placed on top of the Savonius rotor with an apex of said conical solar collector facing up, said conical solar collector rotating with the Savonius rotor.

10. The Savonius rotor wind turbine of claim 9 wherein the conical solar collector comprises a plurality of isoceles triangle shapes of solar material creased from an apex to a center of a base such that a cross section of the solar collector isosceles triangle is a "V" shape; said plurality of creased solar collector isosceles triangles being arranged into the cone.

11. A method of configuring a Savonius rotor comprising at least one vane, each Savonius rotor vane having at least one concave and at least one convex side, the method comprising:
    (a) disposing the Savonius rotor on a rotational axis;
    (b) shaping said concave side in cross-section along a plane perpendicular to said rotational axis, such that the concave said consists of a line which is continuously curved; and
    (c) providing at least one exhaust channel to permit air to pass through the Savonius rotor vane from the concave side to the convex side.

12. The method of claim 11 additionally comprising the step of forming the at least one vane in an "S" shape when viewed from an axis of rotation.

13. The method of claim 11 additionally comprising the steps of:
    (a) stacking a plurality of Savonius rotors one above another; and
    (b) rigidly affixing the plurality of Savonius rotors to one another, all sharing a common axis of rotation.

14. The method of claim 11 additionally comprising covering outer surfaces of the Savonius rotor wind turbine with solar collector material for converting solar radiation to electrical energy.

15. The method of claim 14 additionally comprising the steps of:
   (a) constructing a plurality of isosceles triangles from apex to material;
   (b) creasing said plurality of solar collector isosceles triangles from apex to center of base such that a cross section of the solar collector isosceles triangle is a "V" shape;
   (c) arranging said plurality of creased solar collector isosceles triangles into a cone with an apex of the cone facing upward;
   (d) operably attaching said cone above a top circular support plate.

16. A Savonius rotor wind turbine comprising:
   (a) a rotational axis upon which a Savonius rotor is rotatably disposed;
   (b) a vane having a concave and a convex side, said concave side, in cross-section along a plane perpendicular to said rotational axis, consisting of a line which is continuously curved; and
   (c) at least one exhaust channel through said vane, each of said at least one exhaust channels providing a flow path permitting air to pass through the Savonius rotor vane from the concave side to the convex side of said vane of the Savonius rotor.

17. The Savonius rotor wind turbine of claim 16 wherein the vane comprises an "S" shaped vane when viewed from an axis of rotation.

18. The Savonius rotor wind turbine of claim 16 wherein the exhaust channel is constructed so that air passing through the exhaust channel enters a freestream.

19. The Savonius rotor wind turbine of claim 16 wherein the vane, in plan view, comprises a first curved portion operatively coupled with a second curved portion, said operative coupling occurring at an axis of rotation of the Savonius rotor.

20. The Savonius rotor wind turbine of claim 19 wherein the first and second curved portions comprise identical curvatures.

* * * * *